United States Patent [19]
Vasseur

[11] Patent Number: 5,460,664
[45] Date of Patent: Oct. 24, 1995

[54] ALLOY FOR GLASS FIBRE CENTRIFUGES

[75] Inventor: Stella Vasseur, Nancy, France

[73] Assignee: Isover Saint-Gobain, Courbevoie, France

[21] Appl. No.: 226,333

[22] Filed: Apr. 12, 1994

Related U.S. Application Data

[62] Division of Ser. No. 864,339, Apr. 6, 1992, Pat. No. 5,330,591.

[30] Foreign Application Priority Data

Apr. 25, 1991 [FR] France ..................... 91 05097

[51] Int. Cl.$^6$ ................................. C22C 19/05
[52] U.S. Cl. .................. 148/427; 148/410; 420/442; 420/453; 420/459
[58] Field of Search ........................ 148/410, 427, 148/555, 675; 420/442, 453, 459

[56] References Cited

FOREIGN PATENT DOCUMENTS 2459783 1/1981 France.

Primary Examiner—David A. Simmons
Assistant Examiner—Robert R. Koehler
Attorney, Agent, or Firm—Oblon, Spivak, McClelland, Maier, & Neustadt

[57] ABSTRACT

A nickel-based alloy useful in the manufacture of a glass fibre centrifuge of which the composition consists essentially of the following elements expressed as percentage by weight:

| | |
|---|---|
| Cr | 27.5–29.5% |
| W | 6.5–7.8% |
| C | 0.69–0.73% |
| Fe | 7–10% | the remainder substantially being nickel and having in its crystalline structure $M_{23}C_6$ type carbides, M being chromium, at least one equivalent metal, or combination thereof, the $M_{23}C_6$ carbides being substantially secondary.

4 Claims, 3 Drawing Sheets

ALLOY FOR GLASS FIBRE CENTRIFUGES

This is a division of application Ser. No. 07/864,339, filed on Apr. 6, 1992, now U.S. Pat. No. 5,330,591.

BACKGROUND OF THE INVENTION

1. Field of the Invention

The present invention relates to an alloy intended to be used in the manufacture of centrifuges. This alloy is particularly suitable for constructing centrifuges which produce glass fibers.

2. Description of the Background

A centrifuge of this type rotates about its vertical axis at a velocity of the order of 800 to 4000 rpm. A large number of apertures are provided on its peripheral wall. An annular combustion chamber adjacent the centrifuge produces a descending gaseous current which passes along the peripheral wall of the centrifuge and draws the thin streams of glass emerging from the apertures in order to produce small glass fibers.

Molten glass is introduced into the centrifuge and is sprayed under the action of centrifugal force towards the inner face of the peripheral wall of the centrifuge. The molten glass passes through the apertures in this wall. The thin glass streams produced outside the centrifuge are then drawn out by the action of the gaseous current.

The stresses to which the centrifuge is subject are threefold: thermal shocks on stopping and starting, hot flow because of the centrifugal forces, and corrosion of the fibre drawing apertures by the glass. As an example, the operating temperatures are of the order of 1000°–1200° C. These are the temperatures at which the glass is at a suitable viscosity.

In view of the particularly harsh operating conditions, centrifuges deteriorate when used for a relatively long time. These centrifuges may have to be replaced for various reasons which include deformation of the fibre-drawing strip, the appearance of horizontal or vertical cracks, large scale wear of the apertures, and the like.

In practice, the most frequent reasons for changing centrifuges are still deformation of the peripheral strip which is manifested by a deterioration in the quality of the fibers produced. This deformation is connected both with the effects of centrifuging on the peripheral strip and weakening of the latter by erosion of the apertures. Nevertheless, an improvement in resistance to corrosion and to deformation cannot be separated from questions concerning the fragile nature of the alloy. It is particularly important to avoid rupture of the centrifuges during operation. It is therefore necessary to select the centrifuge alloy such that it has good resistance to deformation, on the one hand, and, on the other hand, that it is not too fragile. Since these two features are at least on part contradictory, a compromise solution must be reached.

Ni and Cr based alloys for constructing centrifuges of this type are known, in particular, as disclosed in French Patent 2,459,783. This patent recommends an alloy composition which is relatively precise with regard to its principal constituents, in particular the carbon content. Centrifuges produced from the alloy of the prior art on the whole display improved properties. Overall these centrifuges have satisfactorily useful lives. Nevertheless, some centrifuges among those complying with the features of this disclosure have useful lives which are far shorter than the average useful life without any possible explanation for this, and thus any means of foreseeing the reasons for these incidents.

In view of this situation, a need has continued to exist for a solution which enables centrifuges to have the desired useful lives so that they may experience a consistent demand for production.

SUMMARY OF THE INVENTION

Accordingly, one object of the present invention is to provide a centrifuge which eliminates all risks of being rendered obsolete prematurely.

Briefly, this object and other objects of the present invention as hereinafter will become more readily apparent can bed attained with a Ni-Cr alloy for centrifuge construction which consists essentially of the following percentages by weight:

| | |
|---|---|
| Cr | 27.5–29.5% |
| W | 6.5–7.8% |
| C | 0.69–0.73% |
| Fe | 7–10% | with the balance Ni. The structure of the alloy further comprises $M_{23}C_6$ type carbides in which M is Cr or a so-called "equivalent" metal. These carbides are finely dispersed in the structure which ensures that the properties of the centrifuges are the best possible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
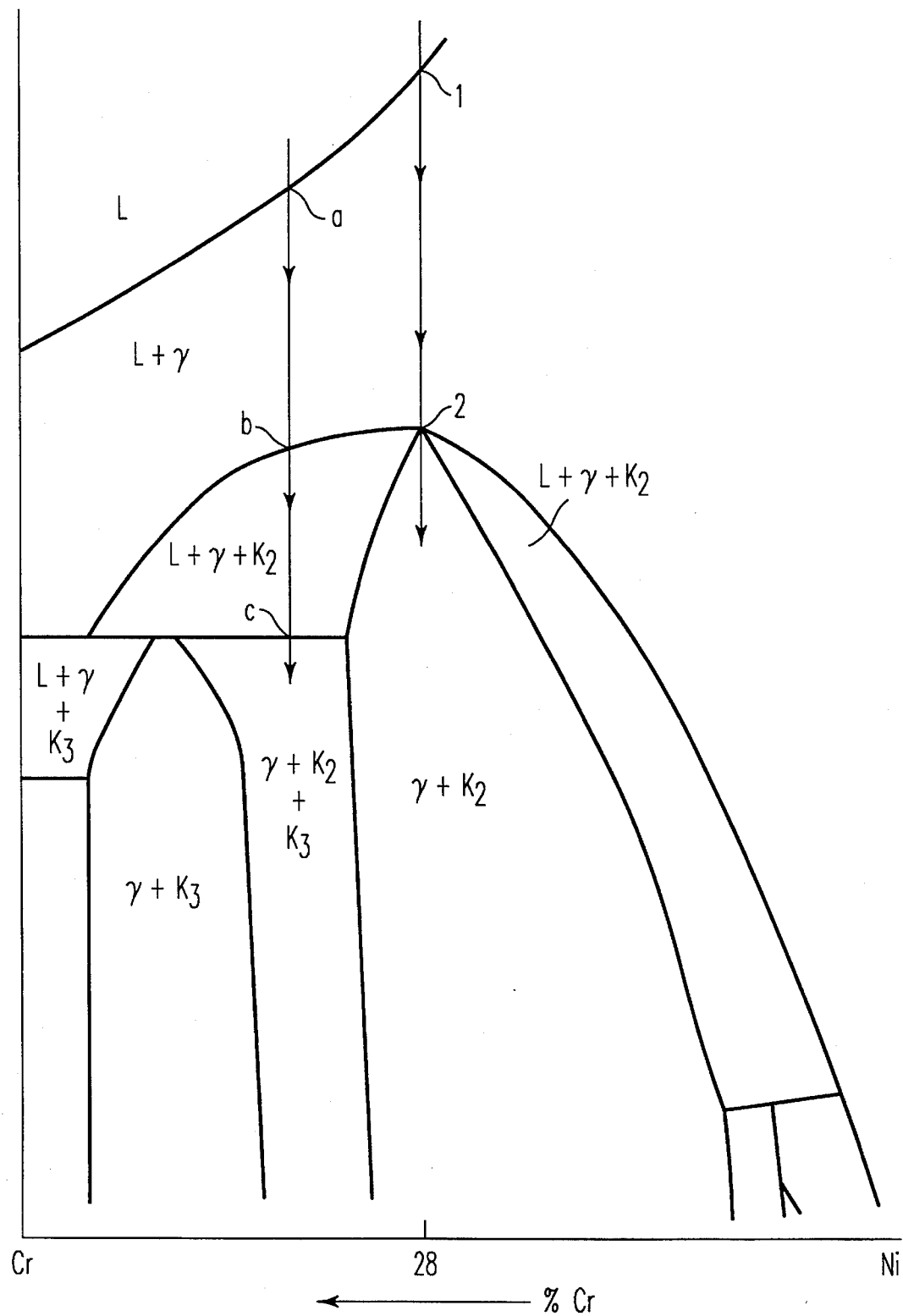
FIG. 1 shows a section through the pseudo-binary Cr—Ni—C diagram with 0.7% carbon.

It has now been demonstrated by metallurgical studies, which will be dealt with in further detail in the examples which follow, that the qualities of the centrifuges and especially their resistance to plastic flow are linked to the presence of carbides having well-defined natures and morphologies. Having identified these structural elements of the centrifuge alloys, the conditions which determine, or at least promote, the formation of these structural elements have now been established and metallurgical processes have been developed by which the centrifuge of the invention may be manufactured.

The carbides play an essential role in the mechanisms on which the control of the plastic flow of the material of which the centrifuge is comprised depends. These carbides come into play because of their ability to block dislocations present in the metal network. Dislocations, however, are only blocked efficiently if the carbides in question are in a sufficiently fine and well dispersed form.

On the basis of alloys used previously for their ability to meet the various requirements, in particular mechanical and chemical resistance at the temperatures in question, it has now been shown that, in order to obtain good resistance to plastic flow, the carbides should be present in the alloy in a proportion which is as high as possible in the $M_{23}C_6$ form, M being Cr or an equivalent metal (W, Si, Zr) from the point of view of the structure.

Studies have now shown the complexity of the mechanisms leading to these particular carbides. The carbides arise because of the diverse nature of the phases which appear during solidification of the molten alloy and during any subsequent heat treatments.

In practice, the present centrifuges are produced by casting the molten alloy. The cast centrifuge is normally subjected to a heat treatment in order to rearrange the structure, which arrangement cannot be attained directly by solidification during casting.

According to the invention, the heat treatment to which the alloy is subjected in principle affects the appearance and distribution of the carbides in the matrix.

The terms, "primary carbides" and "secondary carbides" are used herein to designate the carbides which appear after melting, on the one hand, and after heat treatment, on the other.

In the present invention an alloy composition is described which comprises specific proportions of chromium and tungsten such that the final crystalline structure of the alloy comprises $M_{23}C_6$ type carbides, which, for reasons to be given subsequently, are substantially secondary and distributed homogeneously in the matrix.

In the present alloy, the equivalent chromium content is preferably not more than 38% and is advantageously at least 7% in order to promote the formation of the $M_{23}C_6$ secondary carbides. In addition, in order to maintain good resistance to corrosion at high temperature, the equivalent chromium content is preferably not less than 35% and advantageously not less than 35.5%. In order to improve resistance to corrosion at high temperature and resistance to plastic flow, the chromium content should range from 27.5 and 29.5%, preferably between 7.5 and 28.5%.

Tungsten contributes to the hardness of the alloy and resistance to plastic flow. Its content should range from 6.5 and 7.8%, preferably between 7.2 and 7.6%.

Carbon is an essential element for the formation of carbides. Its content should range from 0.69 and 0.73%.

A small amount of iron is present in the alloy composition. It improves resistance to sulfuration, as nickel-based alloys are highly sensitive to sulfur present in the glasses used. Its content advantageously ranges from 7 and 10%.

Additional elements are also used if necessary in the alloy composition, either in trace amounts introduced with the principle elements or as complementary elements to perfect given properties. Thus, a small amount of silicon, from 0.6 to 0.9%, increases the alloy's hardness and resistance to plastic flow.

A preferred alloy composition of the present invention has the following composition:

| | |
|---|---|
| Ni | 54.5–58% |
| Cr | 27.5–28.5% |
| W | 7.2–7.6% |
| C | 0.69–0.73% |
| Si | 0.6–0.9% |
| Mn | 0.6–0.9% |
| Fe | 7–10% |

A suitable heat treatment enables the secondary carbides to be distributed homogeneously in the metal matrix, thereby hindering the spread of dislocations in the matrix. It has now been shown that for good resistance to plastic flow it is advantageous to have a large number of very fine secondary carbides distributed homogeneously in the alloy. Accordingly, it has been noted that it is preferable if the temperature of the crude solidification structure of the alloy increases rapidly. It has been noted that a slow increase in temperature leads to a nucleation stage which is long. The first nuclei created grow and can coalesce at the same time as the final nuclei appear. A more rapid increase in temperature enables the simultaneous existence of nucleation mechanisms and coalescence of secondary carbides to be avoided. Subsequently, maintaining the alloy at a relatively high temperature for a given amount of time principally encourages the growth of these carbides. A high number of nuclei enables the formation of carbides which are too bulky to be avoided.

It has proved desirable to optimize this process. It is thus preferred to operate at a level temperature which is not too high in order to avoid coalescence of carbides. Moreover, a lower high level temperature corresponds to a longer treatment time. A compromise therefore has to be reached. In this respect, it has appeared advantageous to select a temperature increase velocity which is not less than 3° C./mn.

Further in this respect, it is preferred to maintain the temperature of the heat treatment at less than 1000° C., preferably less than 900° C.

The duration of the heat treatment in these conditions is at least 5 hours, preferably at least 8 hours.

An advanced metallurgical study has enabled the discovery of the influence of the alloy composition, in particular the equivalent chromium content and, more precisely the chromium content, on the nature and morphology of primary carbides, on the one hand, (before heat treatment) and secondary carbides, on the other hand (after heat treatment).

By means of an image analysis technique, it has been discovered that after the heat treatment, alloys having a composition similar to those in French Patent 2,459,783 have secondary carbides of the $M_{23}C_6$ type. However, the nature of these carbides differs from one alloy to another. Given alloys have fine $M_{23}C_6$ carbides. Other alloys have fine $M_{23}C_6$ carbides and $M_{23}C_6$ carbides with the appearance of Chinese writing. Sometimes only $M_{23}C_6$ carbides with the appearance of Chinese writing were noted.

A comparison of the specific composition of each of these alloys has enabled the discovery that the alloys having equivalent chromium percentage of more 38%, comprise either $M_{23}C_6$ type carbides resulting from the heat treatment (secondary carbides), or have the appearance of Chinese writing, or fine. Alloys with an equivalent chromium composition of the order of 38% consist of carbides resulting from the heat treatment (secondary carbides) of the $M_{23}C_6$ type which are substantially fine. The equivalent chromium content thus has a direct influence on the nature of the secondary carbides.

The nature of primary carbides (before heat treatment) in the present alloy composition has been analyzed and especially according to the equivalent chromium content. It has been observed that alloys having a similar composition to that disclosed in French Patent 2,459,783, of which the equivalent chromium content is greater than 38%, have both primary carbides of the $M_{23}C_6$ type with the appearance of Chinese writing and spearhead $M_7C_3$ type carbides. Alloys of which the equivalent chromium content is on the order of 38% have primary carbides of the $M_7C_3$ type with a spearhead morphology. By combining these two observations, firstly the nature of primary carbides and secondly the nature of secondary carbides as a function of the equivalent chromium content, it has been concluded that the nature of primary carbides (before heat treatment) determines the nature of secondary carbides (after heat treatment), i.e.:

(i) $M_7C_3$ primary carbides of the spearhead type are converted during heat treatment (10 hours at 850° C.) into fine secondary carbides of the $M_{23}C_6$ type;

(ii) primary carbides of the $M_{23}C_6$ type with the appearance of Chinese writing are not subject to any modification as regards their nature or morphology during heat treatment irrespective of their type;

(iii) the nature of primary carbides is itself directly connected with the equivalent chromium content of the alloy.

The equivalent chromium content thus determines indirectly the nature of the secondary carbides by means of the nature of the primary carbides.

The critical equivalent chromium content is 38%. Beyond this amount $M_{23}C_6$ type primary carbides with the appearance of Chinese writing form in addition to the $M_7C_3$ spearhead type primary carbides.

FIG. 1 shows a pseudo-binary Ni—Cr—C diagram (FIG. 1) with 0.7% carbon from 90 experimental smelts. The basic composition of the alloy is that used in French Patent 2,459,783 with the exception of the nickel and chromium content. The TSD technique was used for this purpose.

This technique consists in placing a bar of the alloy in question in an aluminum tube. A field magnet enables a 4–5 cm area to be melted locally. A thermo-element is placed at this point to check the temperature. When the area has melted, the assembly comprising the aluminum tube and the sample is drawn at a constant velocity. As it emerges from the area of activity of the field magnet, the liquid starts to solidify at a known rate and independently of the drawing velocity. When a sufficient length has solidified unidirectionally, the assembly is cooled at 70° C./s in a water box. Areas which were liquid before this violent cooling process are solidified with a very fine structure which easily distinguishes them from the parts which were already solid before the abrupt cooling process.

The Cr—Ni—C pseudo-binary diagram is prepared on the basis of a fixed composition where only the amounts of chromium and nickel vary. The contents of the other elements in percentages by weight are:

| | |
|---|---|
| carbon | 0.7% |
| tungsten | 7.2–7.6% |
| silicon | 0.6–0.9% |
| manganese | 0.6–0.9% | the remainder principally being iron.

The binary diagram enables a qualitative indication to be provided with regard to the nature of the phases present in the alloy as a function of the content of chromium and nickel and of the alloy temperature.

The existence of a maximum relative to the area: liquid +γ phase (austenitic matrix)+$M_7C_3$ type carbides—($K_2$+L+γ) is established for a chromium content of the order of 28%, $M_7C_3$=$Cr_6(Fe,Ni)_{0.8}W_{0.2}C_3$ in spearhead configuration. Using this phase diagram, the development of the nature of the phases present in a composition in the liquid phase during its solidification can be followed. For example, the remarkable composition of the order of 28% chromium can be selected and the development of the phases present when the liquid is cooled until it solidifies may be followed.

The following conversions are noted (FIG. 1):

(i) At point 1, some of the liquid is converted into the austenitic phase:

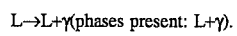
L→L+γ(phases present: L+γ).

(ii) If cooling is continued, the remainder of the liquid will be converted at point 2 into phase $K_2$, i.e. $M_7C_3$=$Cr_6(Fe,Ni)_{0.8}W_{0.2}C_3$:

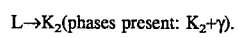
L→$K_2$(phases present: $K_2$+γ).

If the chromium content is now set at more than approximately 28%, the corresponding liquid phase undergoes the following conversions (FIG. 1) during cooling:

(i) at point (a), as previously, some of the liquid phase is converted into the austenitic phase (γ):

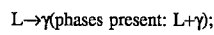
L→γ(phases present: L+γ);

(ii) at point (b), some of the remaining liquid phase is converted into the $K_2$ phase ($M_7C_3$):

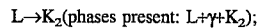
L→$K_2$(phases present: L+γ+$K_2$);

(iii) there is an additional conversion at point (c), relative to the ideal content of 28% chromium which corresponds to a peritectic conversion. The remainder of the liquid phase is converted into phases $K_2$ and $K_3$ on either side of point (c):

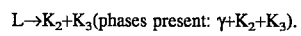
L→$K_2$+$K_3$(phases present: γ+$K_2$+$K_3$).

$K_3$ is of the $M_{23}C_6$ type where $M_{23}C_6$=$Cr_{17}(Fe,Ni)_5W_1C_6$ with the appearance of Chinese writing. Depending on the chromium content in the alloy, the $M_{23}C_6$ phase may thus occur therein. If the critical chromium content of approximately 28% is exceeded, the crude solidification structure presents $M_7C_3$ type and $M_{23}C_6$ type primary carbides. For a chromium content of 28%, the crude solidification structure has primary carbides substantially of the $M_7C_3$ type ($Cr_6(Fe,Ni)_{0.8}W_{0.2}C_3$). New phases appear for chromium contents lower than this value. The nature of the phases can be identified by image analysis.

According to the binary diagram, the chromium content of the alloy in question plays an essential role with respect to the nature and morphology of primary carbides. This result agrees perfectly with the preceding results, i.e. the influence of the equivalent chromium content on the nature of primary carbides. In effect, so-called equivalent chromium metals principally comprise chromium and metals said to be equivalent to chromium. The influence of these so-called equivalent metals, such as tungsten, on the nature of primary carbides present in the alloy is considerable. The occasional presence of some areas which are richer in chromium or tungsten have been demonstrated within the structure of the alloy in question. Segregations then appear which cause $M_{23}C_6$ type primary carbides to precipitate. This irregularity in chromium or tungsten can be explained by an enrichment with these elements during solidification of the residual liquid. Thus the chromium content is preferably restricted to 28.5 in order to be certain not to precipitate primary $M_{23}C_6$ carbides.

The subsequent heat treatment does not alter the morphology of primary carbides. The preparation conditions, such as the velocity of solidification determined, for example, by the casting temperature, may have an effect on the nature and morphology of primary carbides in addition to the alloy composition.

The inventors have performed various tests in order to correlate their observations regarding the nature and morphology of primary and secondary carbides with the alloy's resistance to plastic flow, the tests being indicative of the useful life of centrifuges. Thus, it has been found that the nature of secondary carbides has a very clear influence on the alloy's resistance to plastic flow.

The presence of fine grained secondary carbides resulting from $M_7C_3$ spearhead type primary carbides imparts good resistance to plastic flow in the alloy. On the other hand, the presence of secondary carbides with the appearance of Chinese writing, which are more bulky, imparts poor resistance to plastic flow in the alloy.

One possible explanation for this observation is that plastic flow results from propagation of dislocations through the alloy. Fine secondary carbides are more efficient in preventing these dislocations from spreading than more bulky carbides. In effect, fine carbides which are more numerous, may easily be dispersed throughout the entire alloy. More bulky carbides with the appearance of Chinese writing do not impede the spreading of dislocations so easily. The dislocations may easily bypass any possible obstacles and continue to spread. Fine secondary carbides distributed homogeneously in the alloy matrix will thus provide better resistance to plastic flow than more bulky carbides distributed in an irregular manner.

In view of these results, an objective has been to optimize the heat treatment to which the alloys are subjected. The primary carbides are converted into secondary carbides during the heat treatment. The influence has been demonstrated, firstly, of the velocity of the increase in temperature on the nucleation of secondary carbides and, secondly, the influence of the time and level of temperature on the increase of these secondary carbides.

A relatively high velocity of temperature increase avoids the simultaneous presence of nucleation phases and coalescence of secondary carbides. The growth of the latter is facilitated by a lower level of temperature. On the other hand, in order to obtain carbides of a suitable size, the longer the time at which they are maintained at this temperature, the lower the level of temperature. A compromise has to be found between these two parameters.

Having generally described this invention, a further understanding can be obtained by reference to certain specific examples which are provided herein for purposes of illustration only and are not intended to be limiting unless otherwise specified.

Example 1 illustrates the influence of the alloy composition on resistance to plastic flow. Examples 2 to 5 illustrate the influence of time and temperature parameters on the distribution of carbides throughout the matrix.

EXAMPLE 1

Figure 2:
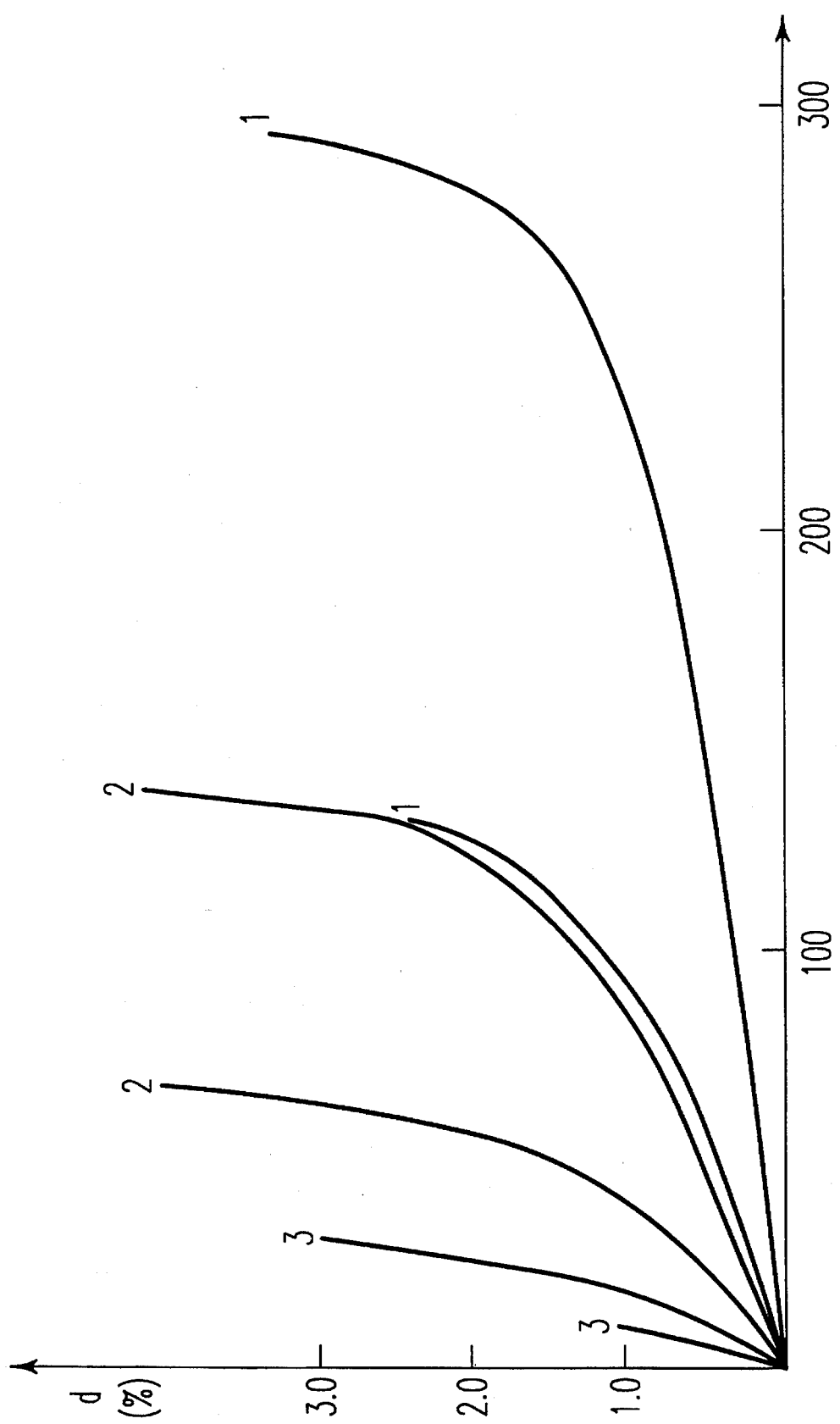
FIG. 2 illustrates Example 1 and shows the plastic flow curves of various samples differing by the nature of the solidification carbides (primary carbides) are shown therein.

Three series of samples were prepared in order to test their resistance to plastic flow. These samples are subjected to a traction force of 35 MPa at 1000° C., their deformation is measured as a function of the time. These three series have respectively three different equivalent chromium contents. They were subjected to a heat treatment for 10 hours at 850° C. FIG. 2 shows the correlation between the equivalent chromium content and the resistance to plastic flow of the alloy. The X axis shows the time in hours; the Y axis shows the deformation of the sample as a percentage. This plastic flow curve (time-deformation) is a practical means of quantifying the useful life test of a centrifuge consisting of an alloy of a given composition. For each series of samples, a band is defined which is defined by two curves corresponding to the resistance to plastic flow of samples having a given composition. The bands delimited by curves 1, 2 and 3 correspond respectively to an equivalent chromium content of 38% 39.2% and 41.1%.

| Composition | | | Nature of Primary | Deformation on rupture | Time of Rupture |
|---|---|---|---|---|---|
| Cr (%) | W (%) | $Cr_{eq}$ | Carbides | (%) | (h) |
| 29 | 8.7 | 38 | 100% $MM_7C_3$ | 3–4 | 300 |
| 30.7 | 7.6 | 39.2 | 50% $M_{23}C_6$ 50% $M_7C_3$ | 4 | 60 to 130 |
| 31 | 9.1 | 41.1 | 100% $M_{23}C_6$ | 3 | <30 |

It should be remembered that $Cr_{eq}=Cr+W+Si+Nb$.

The nature of the carbides and their distribution were identified by image analysis. The best results correspond to a minimum deformation for a maximum amount of time.

According to these results, it appears that an equivalent chromium content of more than 38% has a harmful effect on the resistance to plastic flow of an alloy of this type.

EXAMPLE 2

Two series of samples having the following composition were prepared:

| | |
|---|---|
| carbon | 0.69–0.73% |
| tungsten | 7.2–7.6% |
| chromium | 28.5–29.5% |
| nickel | 54.5–58% | the remainder essentially comprising iron.

Each series of samples was subjected to heat simulation on a dilatometer. The rate of temperature increase is varied respectively from 6° C./mn and 1° C./mn to a temperature of 1000° C. At this temperature, the samples are cooled abruptly. The carbides are then analyzed by image analysis. The inventors have demonstrated the nucleation of secondary carbides during this increase in temperature. The velocity of 6° C./mn promotes nucleation which is more homogeneous.

EXAMPLE 3

Various samples were prepared according to the composition in Example 2. They were subjected to the following heat treatments:

| Time sample maintained at temperature | Temperature at which sample maintained | Results |
|---|---|---|
| 10 h | 850° C. | fine homogeneous secodnary carbides |
| 4 h < t < 10 h | 950° C. | beginning of coalescence |
| 4 h < t < 10 h | 1050° C. | beginning of coalescence |
| 4 h | 1190° C. | strong coalescence |

Coalescence of the carbides impairs resistance to plastic flow; the carbides are no longer dispersed homogeneously in the matrix. They form masses here and there, which can easily be evaded by dislocations. Beyond 850° C., the higher the temperature, the greater the coalescence of the secondary carbides. Maintaining them at a lower temperature provides the best results.

EXAMPLE 4

The influence of the time for which the samples are maintained at a given temperature was studied. The temperature at which they are maintained is 1000° C. The composition of the samples is the same as in Example 2.

| Time | Results |
|---|---|
| < 2 h | growth of secondary carbides |
| 4 h < t < 24 h | progressive coalescence - elongate carbides |

A time for which the samples are maintained at a given temperature of less than 2 hours is more beneficial to good resistance to plastic flow than a time greater than this value for a temperature of 1000° C. In effect, the more the time is increased, the more the secondary carbides, not obstructing the spread of dislocations, which is the cause of certain plastic flow, coalesce.

Thus according to Examples 3 and 4 a compromise is to be found between the time and level temperature during the heat treatment.

EXAMPLE 5

Figure 3:
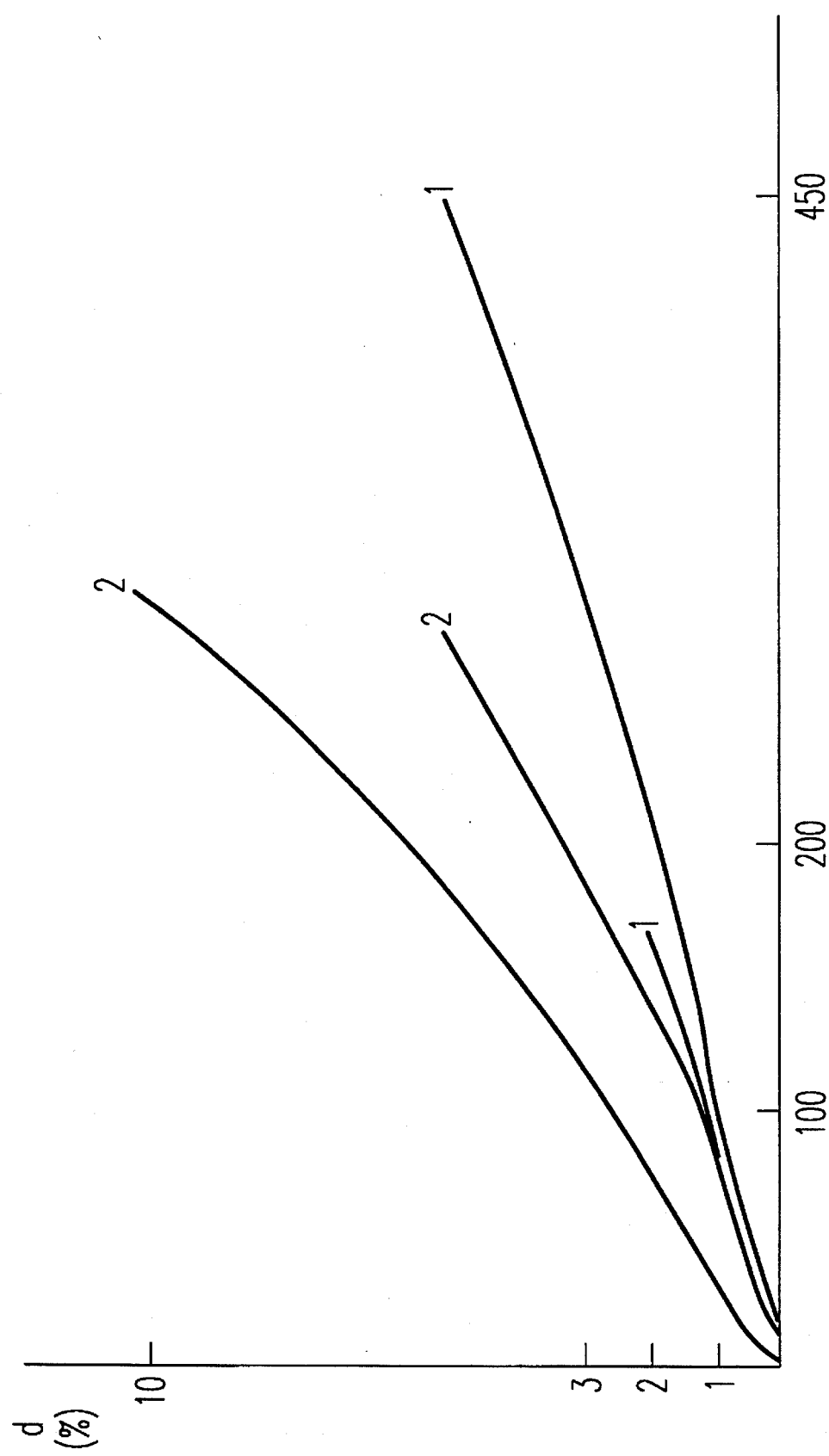
FIG. 3 illustrates Example 5 and is an illustration of the plastic flow of samples subjected to different heat treatments.

Various samples were prepared from the composition of Example 2 and subjected to plastic flow tests. FIG. 3 shows the behavior with respect to plastic flow of two series of samples subjected to different heat treatments. Curve 1 corresponds to a heat treatment of 10 hours at 850° C.; a lesser degree of deformation is obtained with respect to the samples which were subjected to a heat treatment for 4 hours at 1000° C. (curve 2). A lower level of temperature provides the best results. The band corresponding to the treatment of 10 hours at 850° C. is shifted towards the greater times for lesser degrees of deformation.

| Treatment | Deformation velocity (area slop $\Pi \times 10^4$) |
|---|---|
| 4 h at 1000° C. | 1.9 to 2.3 |
| 10 h at 850° C. | 0.88 to 0.95 |

The influence of the level of temperature on resistance to plastic flow is greater than the influence of the duration for which the sample is maintained at this temperature (Examples 3 and 4). It is preferred to operate at a lower temperature for a longer amount of time.

These results emphasize the efficiency of the optimized heat treatment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A nickel-based alloy having a composition consisting essentially of the following elements expressed in percent by weight:

| | |
|---|---|
| Cr | 27.5–29.5% |
| W | 6.5–7.8% |
| C | 0.69–0.73% |
| Fe | 7–10% | the remainder substantially being nickel and having in its crystalline structure fine $M_{23}C_6$ carbides distributed homogeneously in the alloy matrix, the $M_{23}C_6$ carbides being substantially secondary carbides formed from an alloy comprising $M_7C_3$ primary carbides, wherein, M is selected from the group consisting of chromium, an equivalent metal, and a combination thereof.

2. The alloy according to claim 1, wherein the composition comprises an amount of element M between 35 and 38%.

3. The alloy according to claim 2, wherein the composition comprises an amount of element M between 35.5 and 37.

4. The alloy according to claim 1, which substantially has the composition:

| | |
|---|---|
| Ni | 54.5–58% |
| Cr | 27.5–28.5% |
| W | 7.2–7.6% |
| C | 0.69–0.73% |
| Si | 0.6–0.9% |
| Mn | 0.6–0.9% |
| Fe | 7–10% |

* * * * *

UNITED STATES PATENT AND TRADEMARK OFFICE
CERTIFICATE OF CORRECTION

PATENT NO. : 5,460,664
DATED : October 24, 1995
INVENTOR(S) : Stella Vasseur It is certified that error appears in the above-identified patent and that said Letters Patent is hereby corrected as shown below:

Column 2, line 14, "bed" should read --be--.

Column 3, line 34, "7%" should read --37%--.

Column 3, line 38, "not less 35.5%" should read --not less than 35.5%--.

Column 4, line 56, "more 38%" should read --more than 38%--.

Column 7, lines 2-4, "28.5
  in order to be certain not to precipitate primary $M_{23}C_6$ carbides." should read --28.5% in order to be certain not to precipitate primary $M_{23}C_6$ carbides.--

Column 8, in the table, "100% $MM_7C_3$" should read --100% $M_7C_3$--.

Column 10, line 49, "37" should read --37%--.

Signed and Sealed this

Thirtieth Day of July, 1996

Attest:

BRUCE LEHMAN

*Attesting Officer*  *Commissioner of Patents and Trademarks*